(12) United States Patent
Fahrny et al.

(10) Patent No.: US 8,099,369 B2
(45) Date of Patent: Jan. 17, 2012

(54) METHOD AND SYSTEM FOR SECURING CONTENT IN MEDIA SYSTEMS

(75) Inventors: James William Fahrny, Pueblo, CO (US); William Helms, Longmont, CO (US); John Carlucci, Boulder, CO (US)

(73) Assignee: NGNA, LLC, Denver, CO (US)

( * ) Notice: Subject to any disclaimer, the term of this patent is extended or adjusted under 35 U.S.C. 154(b) by 873 days.

(21) Appl. No.: 11/006,864

(22) Filed: Dec. 8, 2004

(65) Prior Publication Data

US 2006/0122946 A1 Jun. 8, 2006

(51) Int. Cl.
*G06Q 20/00* (2006.01)
(52) U.S. Cl. ............ 705/71; 380/31; 380/210; 380/232; 380/200; 380/201; 725/31; 705/59
(58) Field of Classification Search ................... 713/176, 713/168; 380/211, 277, 216, 241, 31, 210, 380/232, 200, 201; 725/31
See application file for complete search history.

(56) References Cited

U.S. PATENT DOCUMENTS

| | | | |
|---|---|---|---|
| 4,792,973 A | 12/1988 | Gilhousen et al. | |
| 4,860,353 A | 8/1989 | Brown | |
| 5,054,067 A | 10/1991 | Moroney et al. | |
| 5,671,276 A | 9/1997 | Eyer et al. | |
| 5,734,720 A * | 3/1998 | Salganicoff | 380/211 |
| 5,784,095 A | 7/1998 | Robbins et al. | |
| 5,982,363 A | 11/1999 | Naiff | |
| 6,157,719 A | 12/2000 | Wasilewski et al. | |
| 6,271,837 B1 | 8/2001 | Naiff | |
| 6,424,717 B1 | 7/2002 | Pinder et al. | |
| 6,748,080 B2 | 6/2004 | Russ et al. | |
| 6,898,285 B1 | 5/2005 | Hutchings et al. | |
| 6,976,163 B1 | 12/2005 | Hind et al. | |
| 7,069,452 B1 | 6/2006 | Hind et al. | |
| 2001/0001014 A1 * | 5/2001 | Akins et al. | 380/241 |
| 2001/0046299 A1 | 11/2001 | Wasilewski et al. | |
| 2002/0090090 A1 | 7/2002 | Van Rijnsoever et al. | |
| 2002/0101990 A1 | 8/2002 | Morino et al. | |
| 2002/0118837 A1 * | 8/2002 | Hamilton | 380/277 |
| 2002/0136406 A1 | 9/2002 | Fitzhardinge et al. | |
| 2002/0170054 A1 | 11/2002 | Kudelski et al. | |
| 2003/0002577 A1 | 1/2003 | Pinder | |
| 2003/0097655 A1 * | 5/2003 | Novak | 725/31 |
| 2003/0123667 A1 | 7/2003 | Weber et al. | |
| 2003/0190044 A1 | 10/2003 | Higashi et al. | |
| 2003/0219127 A1 | 11/2003 | Russ et al. | |

(Continued)

FOREIGN PATENT DOCUMENTS

WO 03043310 5/2003

OTHER PUBLICATIONS

Jim Lyle. "HDCP: what it is and how to use it" Originally Published Apr. 18, 2002 pp. 1-5, and Figures 1-6. http://www.edn.com/index.asp?layout=articlePrint&articleID=CA209091.

(Continued)

*Primary Examiner* — Behrang Badii
(74) *Attorney, Agent, or Firm* — Banner & Witcoff, Ltd

(57) ABSTRACT

A method and system for securing transfer, storage, and playback of media content. The method and system relate to securing transfer, storage, and playback of all types of media content, including television, music, electronic games, and other types of electronic data.

11 Claims, 3 Drawing Sheets

U.S. PATENT DOCUMENTS

| | | | |
|---|---|---|---|
| 2004/0057579 | A1 | 3/2004 | Fahrny |
| 2004/0098591 | A1 | 5/2004 | Fahrny |
| 2004/0177369 | A1 | 9/2004 | Akins, III |
| 2004/0208316 | A1 | 10/2004 | Wack et al. |
| 2005/0010778 | A1* | 1/2005 | Walmsley ............... 713/176 |
| 2005/0100161 | A1 | 5/2005 | Husemann et al. |
| 2005/0119967 | A1 | 6/2005 | Ishiguro et al. |
| 2005/0169468 | A1 | 8/2005 | Fahrny et al. |
| 2006/0031873 | A1 | 2/2006 | Fahrny et al. |
| 2006/0137015 | A1 | 6/2006 | Fahrny et al. |
| 2006/0153379 | A1* | 7/2006 | Candelore et al. ......... 380/216 |
| 2006/0184796 | A1 | 8/2006 | Fahrny |
| 2006/0200412 | A1 | 9/2006 | Fahrny et al. |

OTHER PUBLICATIONS

FCC News: Commission Adopts "Navigation Devices" Rules Creating Consumer Market for Set Top Boxes and Other Equipment Used with Video Programming Systems. Originally Published Jun. 11, 1998 pp. 1-3 http://www.fcc.gov/Bureaus/Cable/News_Releases/1998/nrcb8013.html.

"Explorer 4200HD Home Gateway" c2002 Scientific Atlanta Inc. http://www.sciati.com/products/consumers/userguidepdfs/4001344.pdf.

Hopper, Andy, A Network Striped Storage System for Video on Demand, article, http://citeseer.ist.psu.edu/26010.html, Oct. 15, 2004.

ANSI/SCTE 41 2003 (Formerly DVS 301 POD Copy Protection Standard.

FIPS PUB 140-2 "Security Requirements for Cryptographic Modules", May 25, 2001, http://www.itl.nist.gov/fibspubs/.

FIPS PUB 186-2, "Digital Signature Standard" Federal Information Processing Standards Publication (FIPS PUB), Jan. 27, 2000, http://www.itl.nist.gov/fibspubs/.

FIPS-PUB 180-2, "Secure Hash Standard" Federal Information Processing Standards Publication (FIPS PUB), Aug. 1, 2002, http://www.itl.nist.gov/fibspubs/.

FIPS-PUB 46-3 "Data Encryption Standard", Oct. 25, 1999 http://csrc.nist.gov/publications/fips/fips46-3/flips46-3.pdf.

FIPS-PUB 81 "DES Modes of Operation", Dec. 2, 1980; http://www.itl.nist.gov/fipspubs/fip81.htm.

IETF RFC 1750, Randomness Recommendations for Security, (Donald Eastlake, Stephen Crocker and Jeff Schiller), Dec. 1994, www.ietf.org/.

IETF RFC 2104, HMAC: Keyed-Hashing for Message Authentication, (Krawczyk, Bellare, and Canetti), Mar. 1996, www.ietf.org/.

IETF RFC 2630, Cryptographic Message Syntax, (R. Housley), Jun. 1999, www.ietf.org/.

IETF RFC 3280, "Internet X.509 Public Key Infrastructure Certificate and CRL Profile", R. Housley, W. Ford, W. Polk, D. Solo, Jan. 2002, www.ietf.org/.

RSA1, "PKCS #1: RSA Encryption Standard", Version 1.5, RSA Laboratories, Nov. 1993 2.2 Reference Acquisition, http://www.rsasecurity.com/rsalabs/pkcs/.

CableLabs Specifications, www.opencable.com, p. 1, Mar. 18, 2004.

* cited by examiner

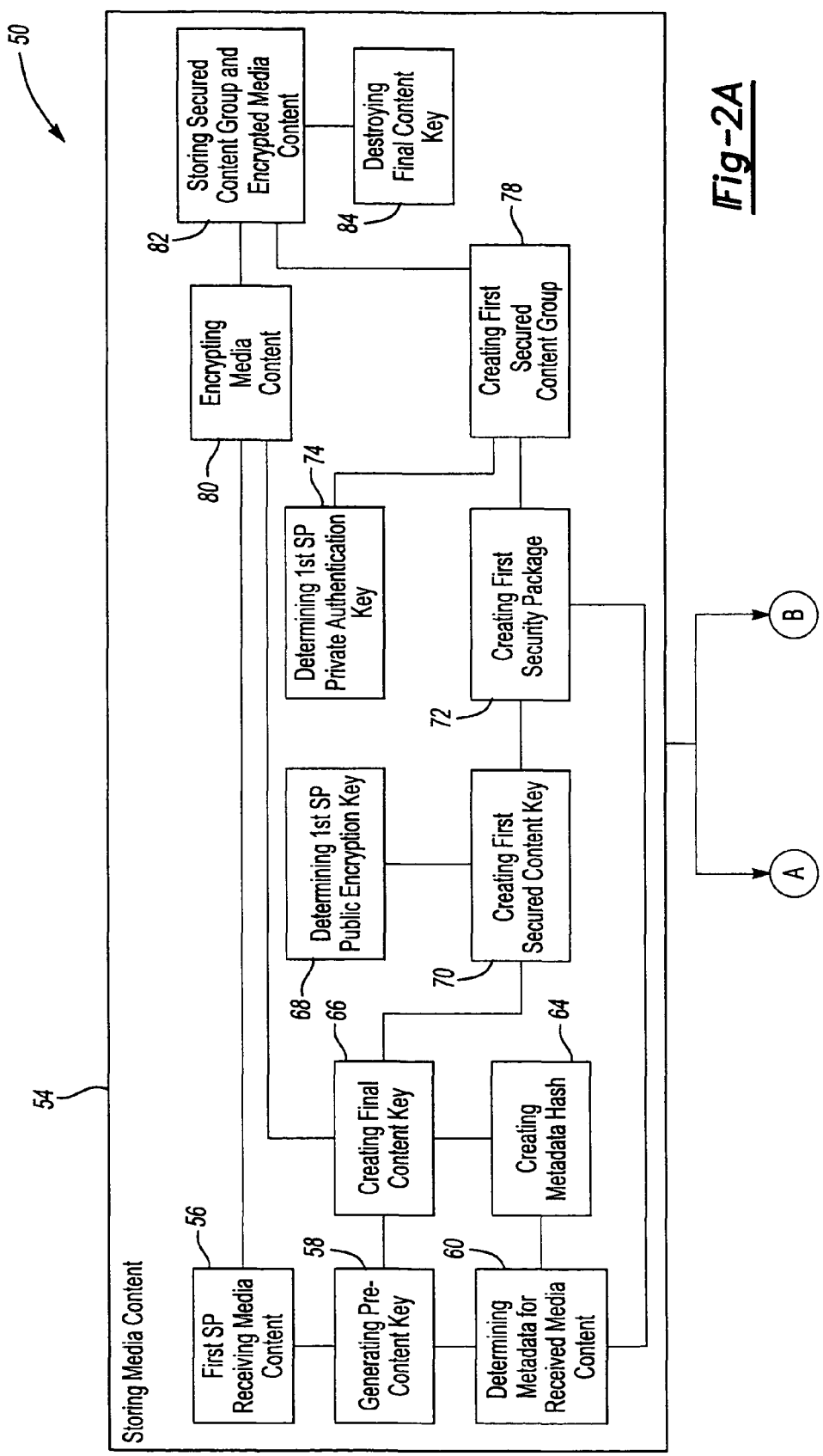

METHOD AND SYSTEM FOR SECURING CONTENT IN MEDIA SYSTEMS

BACKGROUND OF THE INVENTION

1. Field of the Invention

The present invention relates to media systems, and in particular to securing the transfer, storage, and playback of media content in such systems.

2. Background Art

Media systems deliver media content to subscribers of the media services. With the advent of new technologies, it is becoming common for subscribers to transfer the media content to others who have not paid for the content. Of course, this is to the detriment of the media providers and the artist creating the media content.

Accordingly, it is desirable to limit the unauthorized copying of such media content so that it may not be easily transferred to non-subscribers.

SUMMARY OF THE INVENTION

One aspect of the present invention relates to a method of securing transfer, storage, and playback of media content stored on a first media access control point having a first security processor (SP) and a media content recorder (MCR). Preferably, the first media access control point receives the media content from a content provider and delivers at least a portion of the received media content to the first SP. The first SP preferably encrypts the media content for storage on the MCR and decrypts the stored media content for playback from the MCR. The method preferably includes encrypting the media content with a final content determined by the first SP. The method preferably further includes encrypting the final content key with a first SP public encryption key to create a first secured content key such that the final content key may be recovered by decrypting the first secured content key with an first SP private encryption key. Preferably, the first SP public and private encryption keys are associated with the first SP and stored thereon. The method still preferably further includes destroying the final content key such that the encrypted media content may not be decrypted without decrypting the secured content key with the SP private encryption key stored on the SP.

In accordance with one aspect of the present invention, the method may include enhancing security of the final content key by creating the final content key based on a pre-content key and a metadata hash. Preferably, the first SP creates the pre-content key from a random data generator and hashes the metadata associated with the media content to create the metadata hash.

In accordance with one aspect of the present invention, the method may include associating the first secured content key with metadata associated with the media content to create a first security package having the first secured content key and the metadata. Optionally, security of the first security package may be enhanced by signing the security package by hashing the first security package and encrypting the hashed first security package with a first SP private authentication key to create a first secured content group. Thereafter, the first secured content group and the encrypted media content may be stored on the MCR.

In accordance with one aspect of the present invention, a request for playback of encrypted media content stored on the MCR may be received. In response thereto, the method preferably includes locating the first secured content group associated with the requested media content and providing the associated first secured content group to the first SP for decryption and recovery of the final content key required for decrypting the requested media content so that the media content may be decrypted with the recovered final content key.

In accordance with one aspect of the present invention, a request for playback of encrypted media content stored on the MCR for a second media access control point located remotely from the first media access control point may be received. In response thereto, the method preferably includes locating the first secured content group associated with the requested media content and providing the associated first secured content group to the first SP for decryption and recovery of the final content key required for decrypting the requested media content. Thereafter, the recovered final content key is preferably encrypted with a second SP public encryption key to create a second secured content key such that the final content key may be recovered by decrypting the second secured content key with a second SP private encryption key. Preferably, the second secured content key is associated with the metadata to create a second security package having the second secured content key and the metadata, signed by hashing the second security package and encrypting the hashed second security package with a second SP private authentication key to create a second secured content group, and transported to a second SP of the second media access control point. The method may further include the second SP decrypting the second secured content package with the second SP private encryption key to recover the final content key.

One aspect of the present invention relates to a system for securing transfer, storage, and playback of media content. The system preferably includes a first security processor (SP) configured to: decrypt media content with a first encryption element; encrypt the first encryption element; destroy the first encryption element; decrypt the encrypted first encryption element to recover the first encryption element; and decrypt the media content with the recovered first encryption element.

In accordance with one aspect of the present invention, the system preferably further includes a media content recorder (MCR) in communication with the first SP for storing the encrypted media content and the encrypted first encryption element.

In accordance with one aspect of the present invention, the system preferably further includes a first media output device in communication with the first SP, wherein the first SP is further configured to: receive the encrypted media content and encrypted first encryption element from the MCR; decrypt the received first encryption element to recover the first encryption element; decrypt the received media content with the recovered first encryption element; and output the decrypted media content to the media output device for playback.

In accordance with one aspect of the present invention, the system preferably further includes a second SP in communication with the first SP, wherein the first SP is configured to: receive the encrypted media content and encrypted first encryption element form the MCR; decrypt the received first encryption element to recover the first encryption element; re-encrypt the recovered first encryption element with an public encryption element of the second SP; and output the re-encrypted first encryption element to the second SP to thereby secure transmission of the first encryption element from the first SP to the second SP.

In accordance with one aspect of the present invention, the second SP is preferably configured to: decrypt the re-encrypted first encryption element to recover the to recover the first encryption element; decrypt the received media content with the recovered first encryption element; and output the decrypted media content to the media output device for playback.

The above features and advantages, along with other features and advantages of the present invention, are readily apparent from the following detailed description of the invention when taken in connection with the accompanying drawings.

BRIEF DESCRIPTION OF THE DRAWINGS

FIGS. 2A-C illustrate a flowchart of a method for securing transfer, storage, and playback of media content in accordance with one aspect of the present invention.

DETAILED DESCRIPTION OF THE PREFERRED EMBODIMENT(S)

Figure 1:
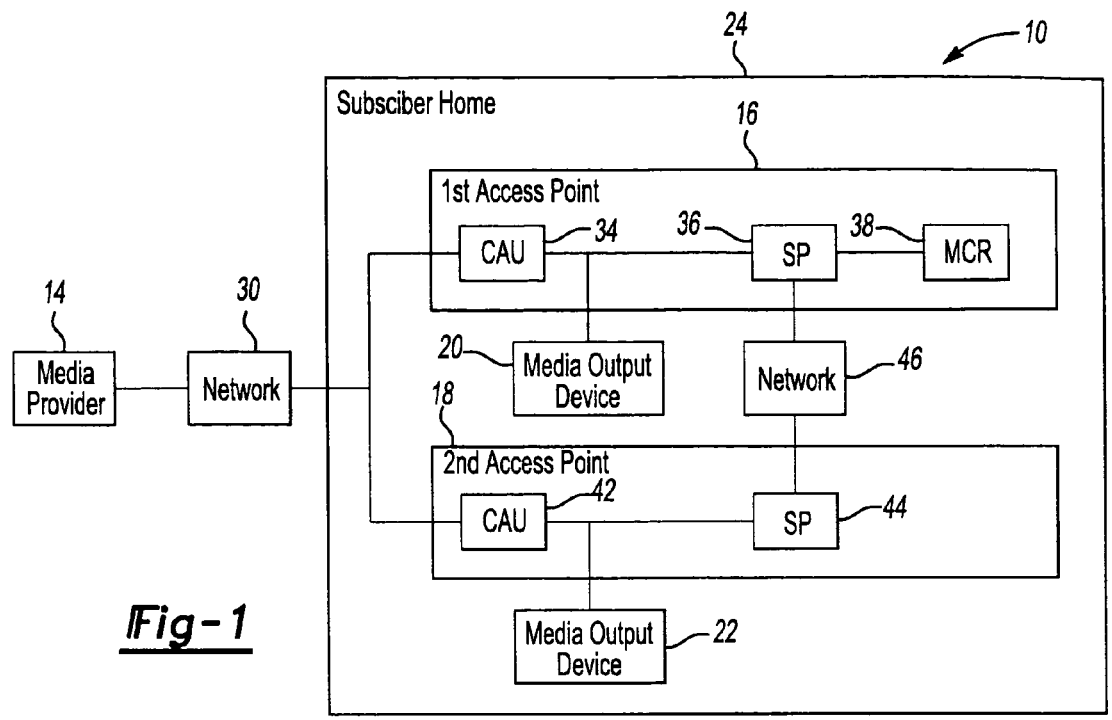
FIG. 1 illustrates an electronic media system for securing transfer, storage, and playback of media content in accordance with one aspect of the present invention.

FIG. 1 illustrates an electronic media system 10 in accordance with one aspect of the present invention. The system 10 includes a media provider 14, a first media access control point 16, a second media access control point 18, a first media output device 20, and a second media output device 22. The system 10 generally relates to a multi-room environment of a subscriber home 24.

The system 10 permits the transfer of media content from the media provider 14 over a cable network 30 to the media access points 16, 18, which decrypt the signals for output to the media output devices 20, 22. The system 10 may be configured to provide all types of electronic media content to the subscriber home 24, including television, music, electronic games, and other types of electronic data.

In accordance with the present invention, the media access points 16, 18 are configured to secure the media content transferred thereto so that it may not be easily copied or proliferated to non-authorized users, i.e., non-subscribers. For exemplary purposes, the description hereinafter relates to the media provider 14 being a cable provider that provides video media content to the media access control points 16, 18. Of course, the present invention is not limited to content provided by a cable services provider, as other sources of content are contemplated as well other types of content. In addition, the present invention is not limited to providing media content to the subscriber home 24. Rather, the present invention contemplates that the media access control points 16, 18 may be at separate subscriber locations. Moreover, the present invention contemplates that the media services may be provided through other means and systems besides cable systems, such as through wireless, satellite, and other telecommunication arrangements.

The first media access control point 16 preferably includes a first conditional access unit (CAU) 34, a first security processor (SP) 36, and a media content recorder (MCR) 38. In general, the first CAU 34 decrypts the encrypted media content provided by the cable provider 14. It may be a CableCard or other device, as one having ordinary skill in the art will appreciate. The first CAU 34 outputs the decrypted media content to either of the first media output device 20 or to the first SP 36. The first SP 36 encrypts the media content for secure storage on the MCR 38. The media content streamed directly from the first CAU 34 to the first media output device 20 is not secured as it typically corresponds with freely copied media content. The media content delivered to the first SP 36 is secured in accordance with the present invention, such as to prevent unauthorized copying and playing of the media content. The MCR 38 is preferably a digital video recorder (DVR), however, the present invention contemplates that it may be other recording devices.

The second media access control point 18 preferably includes a second conditional access unit (CAU) 42 and a second security processor (SP) 44. Unlike the first media access control point 16, the second media access control point 18 preferably does not include an MCR, though the present invention contemplates that it may include an MCR. Rather, media content stored on the MCR 38 is transferable over a network 46, such as with a local area network (LAN) or some other transport, like MPEG-2 or Radio Frequency, to the second media access control point 18. In this manner, media content stored on the first media access control point 16 may be requested by a user of the second media access control point 18 for output therefrom.

The media access control points 16, 18 are preferably separate set-top box elements, integrated television components, or similar features that connect to the media output devices 20, 22. However, the present invention contemplates that the media access control points 16, 18 may be integrated into the media access control points and/or remotely located therefrom. In particular, the present invention contemplates that the MCR 38 may be remotely located from the first media access control point 16, such as at an off-site location outside the subscriber home 24.

Figure 2B:
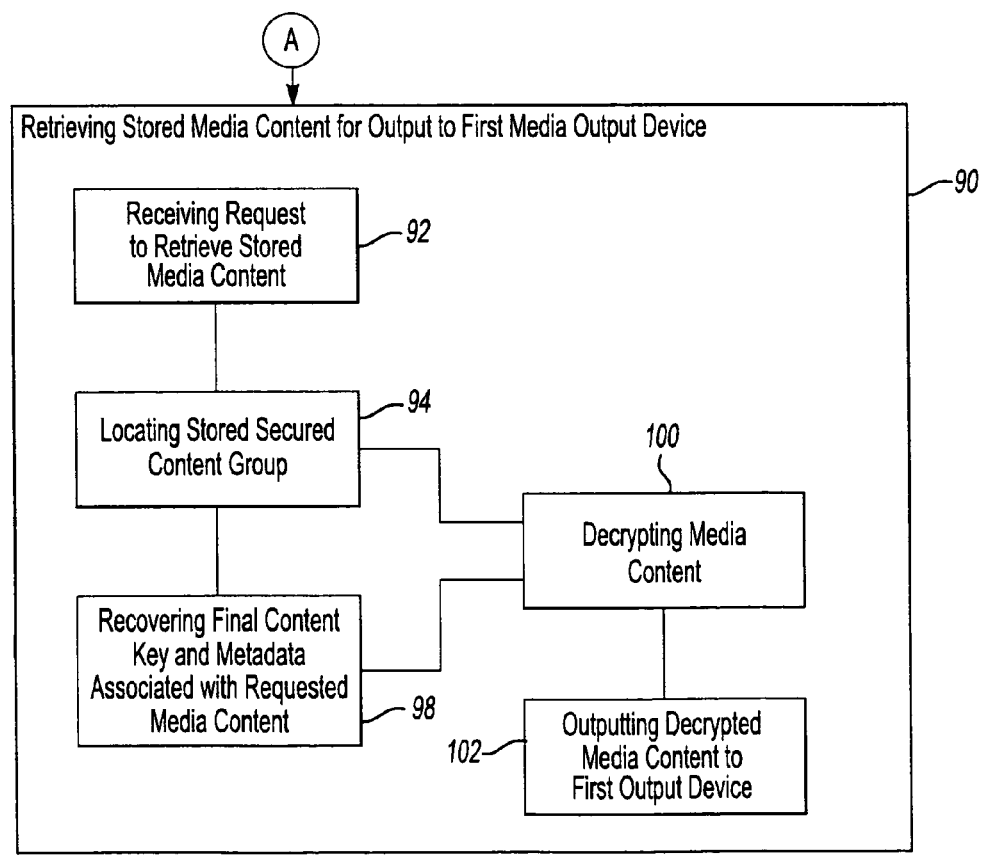
Figure 2C:
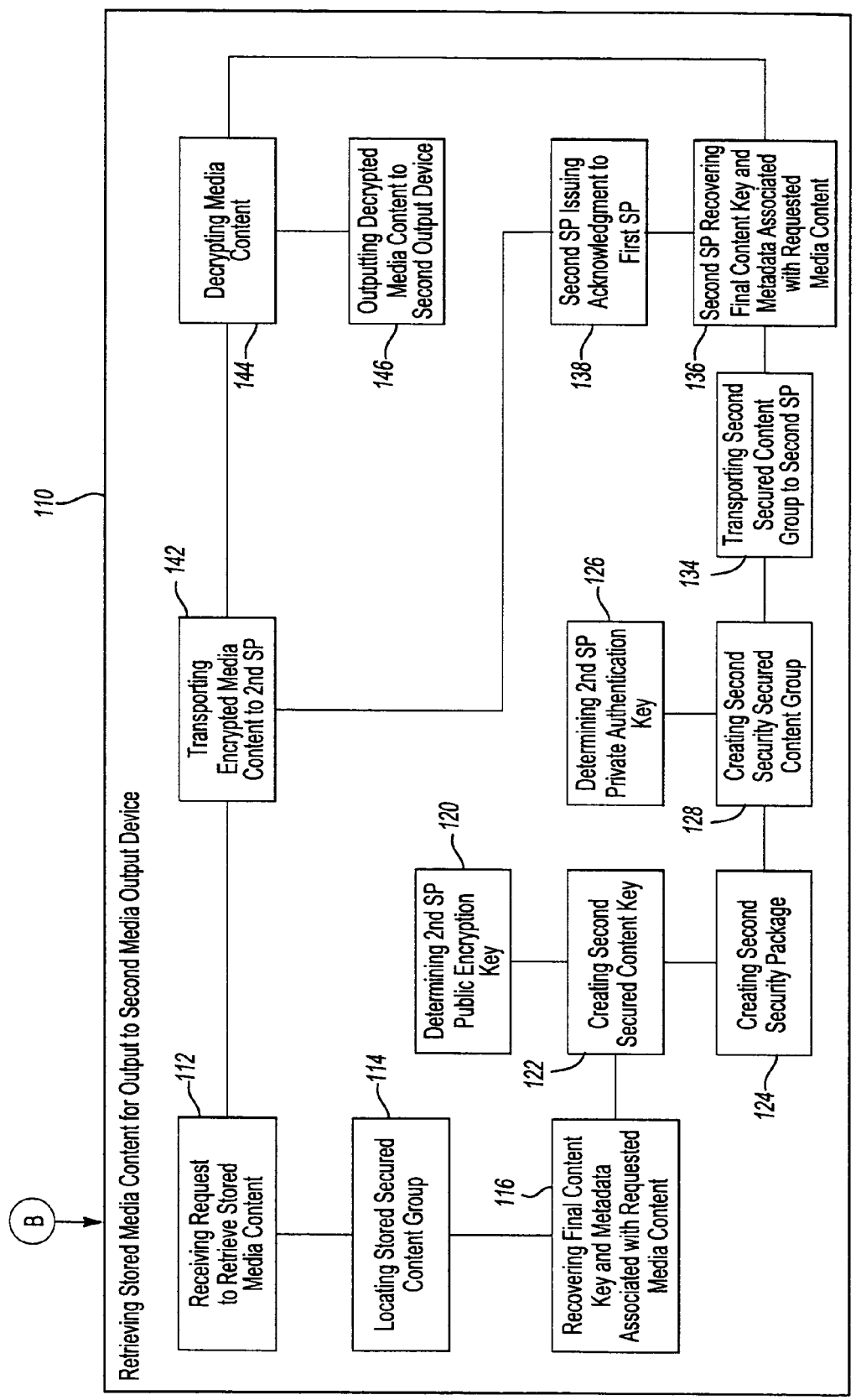

FIGS. 2A-C illustrate a flowchart 50 of a method for securing media content in accordance with one aspect of the present invention. The example provided below relates to securing video media content stored on the MCR 38, however as described above, the present invention is not limited to a particular type of media content.

Block 54 relates to securing storing media content provided by the media content provider 14. Block 56 relates to the first SP 16 receiving media content from the first CAU 34 after it has been decrypted by the CAU 34 according to a decryption key provide by the media content provider 14 or embedded on the CAU 34.

Block 58 relates to the first SP 36 generating a first pre-content key with random seed data. The first pre-content key is a symmetric encryption key used by the first SP 36 for encrypting data. The random seed data is included within an algorithm embedded on the first SP 36 to generate the pre-content key. The random data may be added from a random number generator that the algorithm uses to associate a random number to the pre-content key so that it may not be easily unlocked by an unauthorized user. Alternatively, other data may be used, such as a timestamp, a private key, a subnet ID or domain ID, or other ephemeral data items. The timestamp preferably relates to a counter type device that generates data based on a predefined event, such as time or other sequential operators. The subnet ID is tied to the originating or home network for the media content. As described below in more detail, the use of the random number generation or the seed data is advantageous because unauthorized copying or playback of the media content requires knowledge of this data, which unauthorized users are unlikely to have. Preferably, the random seed data and/or private key is securely protected in hardware on the first SP 36 such that one must have physical access to the SP 36 in order to determine the random number or seed data used to generate the pre-content key.

Block 60 relates to the first SP 36 determining metadata, i.e., usage rights, for the media content received in block 56. The metadata is associated with the media content and provided by the media provider 14. It may include any number of usage or entitlement rules, including a domain ID indicating a domain Host Trusted Domain ID on which the content was originally stored so that it may be used to verify that the content has not been "moved" for viewing without permission to another home network or environment, an encryption mode to indicate the content encryption algorithm applied, such as 2-key 3DES, 3-key 3DES and AES-128, a copy control information (CCI) item to indicate the number of times the content may be copied, a time value that indicates the time of last modification to the content, a number of archival copies generated that may be used to keep track of the number of times the content was explicitly played in order to copy the material (if allowed) on attached devices, a usage expiration date/time to indicate when usage rights expire, i.e., when the content and rights should be removed from the DVR, a playback count number that indicates the number of times the content has been played back, a region and time zone that indicate the region and time zone in which the original recording was made, a usage rights indicator for other domains (e.g., DRM domain) that indicates usage rights that may be applied to other domains, a content protection level indicator that indicates the appropriate level of content security an authorized party needs to provide in order to receive/process the content, a strong link to content file or stream indicator that indicates a hard association to the content so that a hacker may not associate the content With more permissive rights, and/or other operator or system specified encryption items.

Block 64 relates to the first SP 36 generating a one-way hash, such as a SHA1 or MD5 hash, of the metadata in block 60. The one-way hash preferably creates a unique 160-bit identifier or value for the metadata so that variations applied thereto after the hash may be identified.

Block 66 relates to the first SP 36 combining (strongly pairing) the pre-content key with the hashed metadata in an exclusive-or function, or similar function, to create a final content key. The final content key exhibits properties of both pieces of the inputs, i.e. the pre-content key and the hashed metadata, such that it makes the final content key a stronger cryptographic key as it is more difficult for an unauthorized person to access both pieces of information used to create the final content key. Likewise, because the pre-content key and the metadata are strongly paired, it is difficult, if not, impossible to change the metadata (usage rights) without changing the final content key, as such data encrypted with the first final encryption key may not be played back if the usage rights associated therewith are altered.

Block 68 relates to the first SP 36 determining a first SP public encryption key. The public encryption key relates to an encryption key that permits the first SP 36 to encrypt and transmit data in a secure manner. Data encrypted with the first SP public encryption key may only be decrypted with a first SP private encryption key. The first SP public and private encryption keys are preferably embedded or otherwise hardwired into the first SP 36 to limit access thereto.

Block 70 relates to the first SP 36 encrypting the final content key with the first SP public encryption key to create a first secured content key. The first secured content key is basically an encrypted version of the final content key. As described below in more detail, this is done so that only the first SP may decrypt the first secured content key with the first SP private encryption key to recover the final content key.

Block 72 relates to the first SP 36 concatenating or otherwise linking the first secured content key to the metadata to create a first security package. The first security package is a definable packet of data that may be moved from location to location, as described below in more detail.

Block 74 relates to the first SP determining a first SP private authentication key. The private authentication key relates to an authentication key that permits the first SP 36 to encrypt and transmit data in a secure manner. Data digitally signed with the first SP private authentication key may only be verified with a first SP public authentication key. The first SP public and private authentication keys are preferably embedded or otherwise hard-wired into the first SP 36 to limit access thereto.

Block 78 relates to the first SP 36 signing the first security package with a SHA-1 or MD5 hash and encrypting the hash with the first SP private authentication key to create a first secured content group. The signing of the first security package encrypts the hash value according to the first SP private authentication key that prevents altering the hash value and therefore the metadata as the first SP 36 is unable to decrypt the first secured content group with the first SP public authentication key if the metadata data is adjusted and subsequently signed with the first SP private authentication, which may occur if one attempts to alter the usage rights included in the metadata.

Block 80 relates to the first SP 36 encrypting the media content with the final content key. Block 82 relates the first SP 36 storing the encrypted media content and the first secured content group on the MCR 38. A table or other algorithm is preferable included on the MCR 38 or other memory device in communication therewith (not show) that includes a listing or other description of the encrypted media content stored on the MCR 38 such that it may be consulted to locate the encrypted media content and the first secured content package associated therewith. Optionally the secured content package could be contained in the same file with the secured content itself.

Block 84 relates to the first SP 36 destroying the final content key. The destruction of the final content key is advantageous because decryption of the media content encrypted with the final content key is difficult, if not impossible, without the final content key. With its destruction, the only remaining access to the final content key is by way of the first secured content group. Because the first secured content group is encrypted by the first SP public encryption key, and therefore, may only be decrypted by the first SP private decryption key, it is difficult, if not impossible, for an unauthorized user to decrypt the encrypted media content if the encrypted media content is transferred from the MCR 38 to an authorized user as the first SP private decryption key is never exposed outside of the first SP 36. Still further, it is unlikely that an unauthorized user could re-create the final content key because it is itself derived from the pre-content key and the metadata hash, which are based on random variables that are unlikely to be known.

The foregoing is repeated for each definable segment of media content that is to be stored on the MCR 38, such as for movies, television programs, interactive games, pieces or albums of music, and the other media that may be stored on the MCR 38 so that each piece of non-copy free data stored on the MCR 38 is secured. As described above, the MCR 38 is integrated into the first access point, which preferably is a set-top box (STB), with the first CAU and the first SP. The present invention is not so limited, however. Rather, the present invention contemplates that the MCR 38 may be substituted for with some other personal video recorder (PVR) or other recording item, wherein the first SP 36 may encrypt and transport signals/content to remotely located items.

Block 90 relates to retrieving stored media content for output to the first media output device 20. Block 92 relates to receiving an input, such as from a user, for retrieving media content stored on the MCR 38 for output to the first media output device 20. The input may specify a particular movie, television program, interactive game, piece of music, or other definable portion of the media content stored on the MCR 38. Preferably, a descriptive identifier is provided for each piece of media content stored on the MCR 38 to facilitate its retrieval, which may be derived from the metadata, a user input, or the like. Optionally, a graphical user interface (GUI), electronic programming guide (EPG), or other navigatable feature may be included for browsing and/or searching the media content stored on the MCR 38.

Block 94 relates to locating the first secured content group associated with the media content requested in block 92. To locate the first secured content group, the table used to keep track of the media content is preferably consulted based on the inputted descriptive identifier. The located media content and the associated secured content group is preferably transported from the MCR 38 to the first SP 36 for decrypting. The media content may be transported in its entirety and/or streamed to the first SP. Optionally, the transported media content may be deleted from the MCR 38 such that it must be re-encrypted if it is re-stored on the MCR 38 or it may be left on the MCR 38 such that it only needs to be decrypted if requested again in the future.

Block 98 relates to recovering the final content key and metadata included in the secured content group associated with the requested media content. Because the media content was encrypted with the final content key in block 60 and thereafter the final content key was destroyed in block 62, the first SP 36 must first decrypt the first secured content group so that the final content key included therein may be recovered to decrypt the media content. As described above, the storage of the final content key in the first secured content group is itself protected by multiple layers of encryption such that the first SP 36 must include the first SP public authentication key. In particular, the first SP public authentication key is used to verify the digital signature on the first secured content group in order to verify integrity of the first security package. The first SP private encryption key is thereafter used to decrypt the first secured content key, which is included in the first security package, to recover the final content key Block 100 relates the first SP 36 decrypting the media content with the final content key recovered in block 98. The decrypted media content is transported to the media output device 20 for playback at block 102.

Block 110 relates to retrieving stored media content for output to the second media output device 22. Block 112 relates to receiving an input, such as from a user, for retrieving media content stored on the MCR 38 for output to the second media output device 22. The input may specify a particular movie, television program, interactive games, piece of music, or other definable portion of the media content stored on the MCR 38. Preferably, a descriptive identifier is provided for each piece of media content stored on the MCR to facilitate its retrieval, which may be derived from the metadata, a user input, or the like. Optionally, a graphical user interface (GUI), electronic programming guide (EPG), or other navigatable feature may be included for browsing and/or searching the media content stored on the MCR 38.

Block 114 relates to locating the first secured content group associated with the media content requested in block 112. To locate the first secured content package, the table used to keep track of the media content is preferably consulted based on the inputted descriptive identifier. The secured content group associated with the requested media content is preferably transported from the MCR 38 to the first SP 36 for decrypting.

Block 116 relates to recovering the final content key and metadata included in the first secured content group associated with the requested media content. Because the media content was encrypted with the final content key in block 60 and thereafter the final content was destroyed in block 62, the first SP 36 must first decrypt the first secured content group so that the final content key included therein may be recovered to decrypt the media content. As described above, the storage of the final content key in the first secured content group is itself protected by multiple layers of encryption such that the first SP 36 must include the first SP public authentication. In particular, the first SP public authentication key is used to verify the digital signature on the first secured content group in order to verify integrity of the first security package. The first SP private encryption key is thereafter used to decrypt the first secured content key, which is included in the first security package, to recover the final content key.

Block 120 relates to the first SP 36 determining a first SP public encryption key of the second SP 44. The public encryption key relates to an encryption key that permits the first SP 36 to encrypt and transmit data in a secure manner to the second SP 44. Data encrypted with the second SP public encryption key may only be decrypted with a second SP private encryption key. The second SP public encryption key is preferably embedded or otherwise hard-wired into the first SP 36 to limit access thereto. The second SP private encryption key is preferably embedded or otherwise hard-wired into the second SP 44 to limit access thereto.

Block 122 relates to the first SP 44 encrypting the final content key with the second SP public encryption key to create a second secured content key. The second secured content key is basically an encrypted version of the final content key. As described below in more detail, this is done so that only the second SP 44 may decrypt the second secured content key to recover the final content key.

Block 124 relates to the first SP concatenating or otherwise linking the second secured content key to the metadata to create a second security package. The second security package thus becomes a definable packet of data that may be moved from location to location, as described below in more detail.

Block 126 relates to the first SP 36 determining a second SP private authentication key of the second SP 44. The private authentication key relates to an authentication key that permits the first SP 36 to encrypt and transmit data in a secure manner to the second SP 44. Data encrypted with the second SP private authentication key may only be decrypted with a second SP public authentication key. The second SP private authentication key is preferably embedded or otherwise hard-wired into the first SP 36 to limit access thereto. The second SP public authentication key is preferably embedded or otherwise hard-wired into the second SP 44 to limit access thereto. Since the content is encrypted with a symmetric key such as 3-DES or AES and this key is encrypted with the public key of the second SP, the content can be transferred without decrypting and re-encrypting it as part of transfer to a second viewing device. Only the final content key is required to be decrypted and re-encrypted with the Second SP public encryption key.

Block 128 relates to the first SP 36 signing the second security package with a SHA-1 or MD5 hash and encrypting the hash with the second SP private authentication key to create a second secured content group. The signing of the second security package encrypts the hash value according to the second SP private authentication key that prevents altering the hash value and therefore the metadata as the second SP 36 is unable to decrypt the second secured content group with the second SP public authentication key if the metadata data is adjusted and subsequently signed with the second SP private authentication, which may occur if one attempts to alter the usage rights included in the metadata.

Block 134 relates to transporting the second secured content group to the second SP 44. Block 136 relates to recovering the final content key and metadata included in the second secured content group associated with the requested media content. The second SP 44 first decrypts the second secured content group so that the final content included therein may be recovered to decrypt the media content. As described above, the storage of the final content key in the second secured content group is itself protected by multiple layers of encryption such that the second SP must include the second SP public authentication key. In particular, the second SP public authentication key is used to verify the digital signature on the second secured content group in order to verify the integrity of the second security package. The second SP private encryption key is thereafter used to decrypt the second secured content key, which is included in the second security package, in order to access the final content key.

Block 138 relates to the second SP 44 issuing an acknowledgment message to the first SP 36 to indicate that the final content key has been successfully recovered. Preferably, the second secured content group includes an identifier that is discovered by the second SP 44 upon successfully locating the final content key such that this identifier is included in the acknowledgment message.

Block 142 relates to the first SP 36 transporting the encrypted media content to the second SP 44 upon receipt of the acknowledgment message. Preferably, the media content is only transported if the acknowledgment message includes the identifier described above so as to prevent inadvertent delivery of media content to unknown sources issuing false acknowledgment messages.

Block 144 relates the second SP 44 decrypting the media content with the final content key recovered in block 136. The decrypted media content is transported to the media output device 20 for playback at block 146.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for locally securing television signals for subsequent playback, the method comprising:
    descrambling a scrambled television signal in a set-top box (STB);
    encrypting the descrambled television signal in the STB with a content key;
    encrypting the content key in the STB with an encryption key to create a secured content key;
    storing the encryption key in the STB;
    destroying the unencrypted content key in the STB thereby making the content key unavailable unless recovered from the secured content key; and
    storing the encrypted television signal and the secured content key on a media recorder thereby making the television signal available for subsequent playback.

2. The method of claim 1 wherein the encryption key is a public asymmetric key.

3. The method of claim 2 wherein the public asymmetric key is part of an encryption key pair also including a corresponding private key, the method further comprising storing the encryption key pair in the STB.

4. The method of claim 1 wherein the encryption key is a symmetric key.

5. The method of claim 1 further comprising;
    decrypting the secured content key to retrieve the content key;
    re-encrypting the content key with a second device public key associated with a second device, the second device in communication with the STB through a home network; and
    transmitting the re-encrypted content key and the encrypted television signal to the second device.

6. The method of claim 5 further comprising decrypting the re-encrypted content key at the second device with a second device private key and decrypting the encrypted television signal at the second device using the decrypted content key.

7. The method of claim 5 wherein the encryption key used to encrypt the content key is a public key with a corresponding private key and wherein decrypting the secured content key to retrieve the content key comprises decrypting the secured content key with the corresponding private key.

8. The method of claim 1 further comprising receiving usage rights for the television signal at the STB and creating a package based on the usage rights and the secured content key.

9. The method of claim 8 further comprising storing the package on the media recorder in association with the encrypted television signal.

10. The method of claim 9 wherein storing the package on the media recorder in association with the encrypted television signal comprises binding the package to the encrypted television signal.

11. The method of claim 8 wherein the package is a first package, the method further comprising:
    decrypting the secured content key to retrieve the content key;
    re-encrypting the content key with a second device public key associated with a second device, the second device in communication with the STB through a home network;
    creating a second package based on the usage rights and the re-encrypted content key; and
    sending the second package and the encrypted television signal to the second device.

* * * * *